US009600309B2

(12) United States Patent
Prawer et al.

(10) Patent No.: US 9,600,309 B2
(45) Date of Patent: Mar. 21, 2017

(54) SR-IOV FAILOVER AND AGGREGATION CONTROL SYSTEM TO ENSURE WITHIN-PHYSICAL-PORT VEB LOOPBACK

(75) Inventors: Jeff Prawer, Maaleh Adumim, IL (US); James R. Hearn, Portland, OR (US); Waseem Ahmad, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 13/977,606

(22) PCT Filed: Jun. 8, 2012

(86) PCT No.: PCT/US2012/041705
§ 371 (c)(1),
(2), (4) Date: Jun. 28, 2013

(87) PCT Pub. No.: WO2013/184141
PCT Pub. Date: Dec. 12, 2013

(65) Prior Publication Data
US 2013/0339955 A1 Dec. 19, 2013

(51) Int. Cl.
G06F 15/173 (2006.01)
G06F 9/455 (2006.01)

(52) U.S. Cl.
CPC ...... *G06F 9/45533* (2013.01); *G06F 9/45558* (2013.01); *G06F 2009/45595* (2013.01)

(58) Field of Classification Search
None
See application file for complete search history.

(56) References Cited

U.S. PATENT DOCUMENTS 7,466,646 B2 12/2008 Taylor et al.
8,060,875 B1 * 11/2011 Lambeth ............... G06F 9/5077
709/223

(Continued)

FOREIGN PATENT DOCUMENTS

CN 102132252 A 7/2011
WO 2013/184141 A1 12/2013

OTHER PUBLICATIONS

International Preliminary Report on Patentability and Written Opinion received for PCT Patent Application No. PCT/US2012/041705, mailed on Dec. 18, 2014, 8 pages.

(Continued)

*Primary Examiner* — Joshua Joo
(74) *Attorney, Agent, or Firm* — Law Office of R. Alan Burnett P.S

(57) ABSTRACT

Methods, apparatus and systems for effecting Virtual Machine (VM) platform communication loopback and enabling user initiated network port failover. Network communications in platforms employing VMs and having multiple network ports accessible to the VMs are configured to be routed such that communications between VMs in the platform are looped back within the platform, thus not require routing through an external switch. This is facilitated via an Intelligent Channel Bonding Driver that dynamically enforces inter-VM traffic to ensure internal loopback within the same physical port. In another aspect, a user is enabled to initiate failover of a network port on a platform employing a Virtual Machine Manager and a plurality of VMs, wherein updated configuration information is sent to disable Virtual Function (VF) drivers associated with the network port.

17 Claims, 9 Drawing Sheets

(56) References Cited

U.S. PATENT DOCUMENTS

| | | | |
|---|---|---|---|
| 8,265,075 B2* | 9/2012 | Pandey | H04L 49/70 370/386 |
| 8,989,186 B2* | 3/2015 | Koganti | H04L 12/4625 370/392 |
| 9,003,071 B2* | 4/2015 | Liu | G06F 13/16 710/3 |
| 9,043,792 B1* | 5/2015 | Xu | H04L 49/70 370/218 |
| 9,350,666 B2* | 5/2016 | Ravinoothala | H04L 47/125 |
| 2005/0111374 A1 | 5/2005 | Sierecki | |
| 2006/0294516 A1 | 12/2006 | Winner et al. | |
| 2008/0114781 A1* | 5/2008 | Yin | H04L 67/1002 |
| 2010/0057908 A1 | 3/2010 | Smith et al. | |
| 2010/0223397 A1 | 9/2010 | Elzur | |
| 2011/0299402 A1 | 12/2011 | Vobbilisetty et al. | |
| 2012/0284712 A1* | 11/2012 | Nimmagadda | G06F 9/5077 718/1 |
| 2013/0042240 A1* | 2/2013 | Cardona | H04L 49/70 718/1 |
| 2013/0151685 A1* | 6/2013 | Bursell | H04L 45/66 709/223 |
| 2013/0152075 A1* | 6/2013 | Cardona | G06F 9/45558 718/1 |
| 2013/0159572 A1* | 6/2013 | Graham | G06F 13/14 710/104 |
| 2013/0174157 A1* | 7/2013 | Elzur | H04L 41/0213 718/1 |
| 2015/0163172 A1* | 6/2015 | Mudigonda | G06F 9/45558 370/389 |

OTHER PUBLICATIONS

International Search Report and Written Opinion received for PCT Application No. PCT/US2012/041705, mailed on Feb. 27, 2013, 12 pages.

Liu, et al., "High Performance VMM-Bypass I/O in Virtual Machines", 2006 USENIX Annual Technical Conference, 2006, 14 pages.

Willmann, et al., "Concurrent Direct Network Access for Virtual Machine Monitors", HPCA 2007, 2007, pp. 1-12.

* cited by examiner

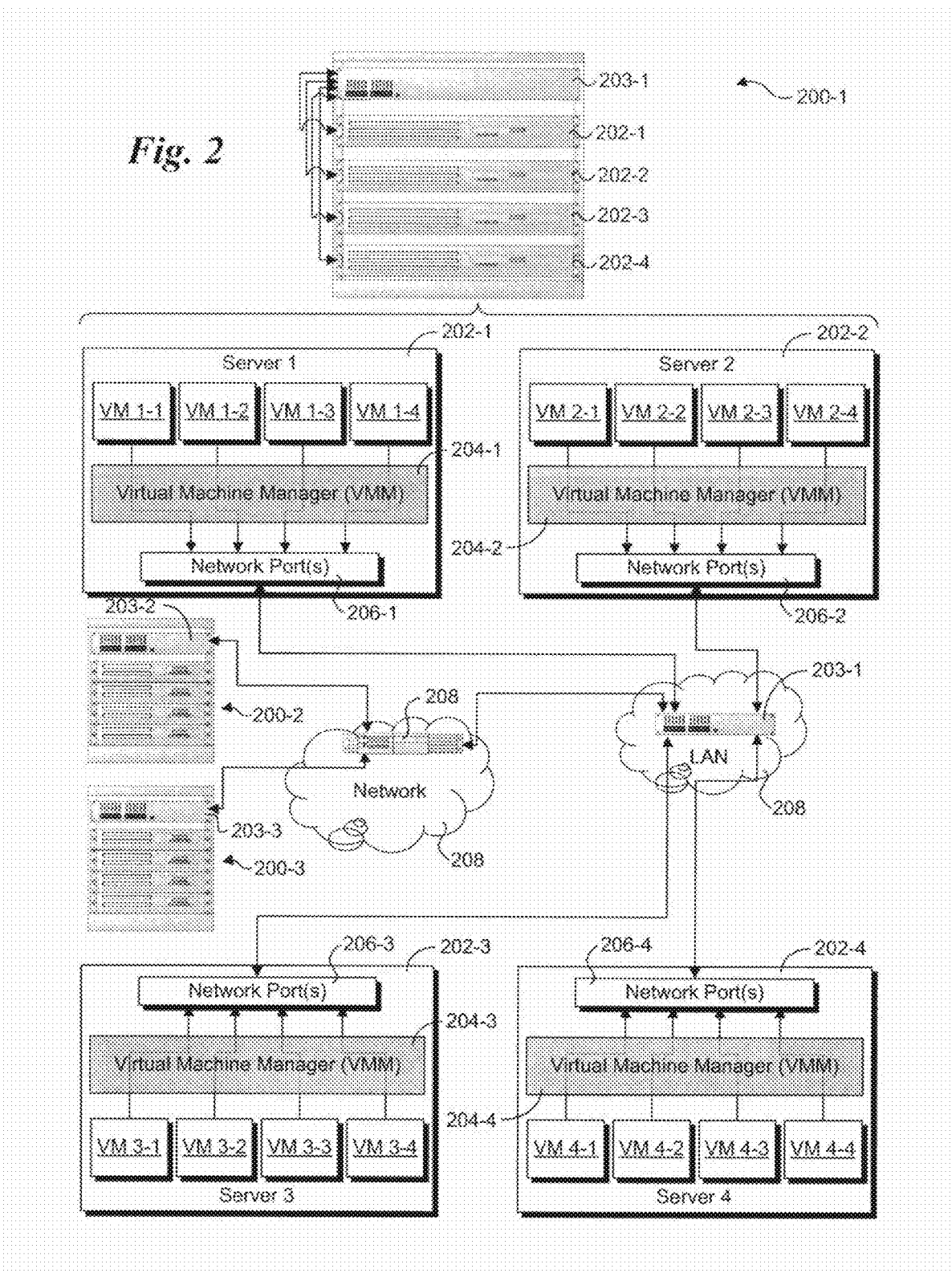

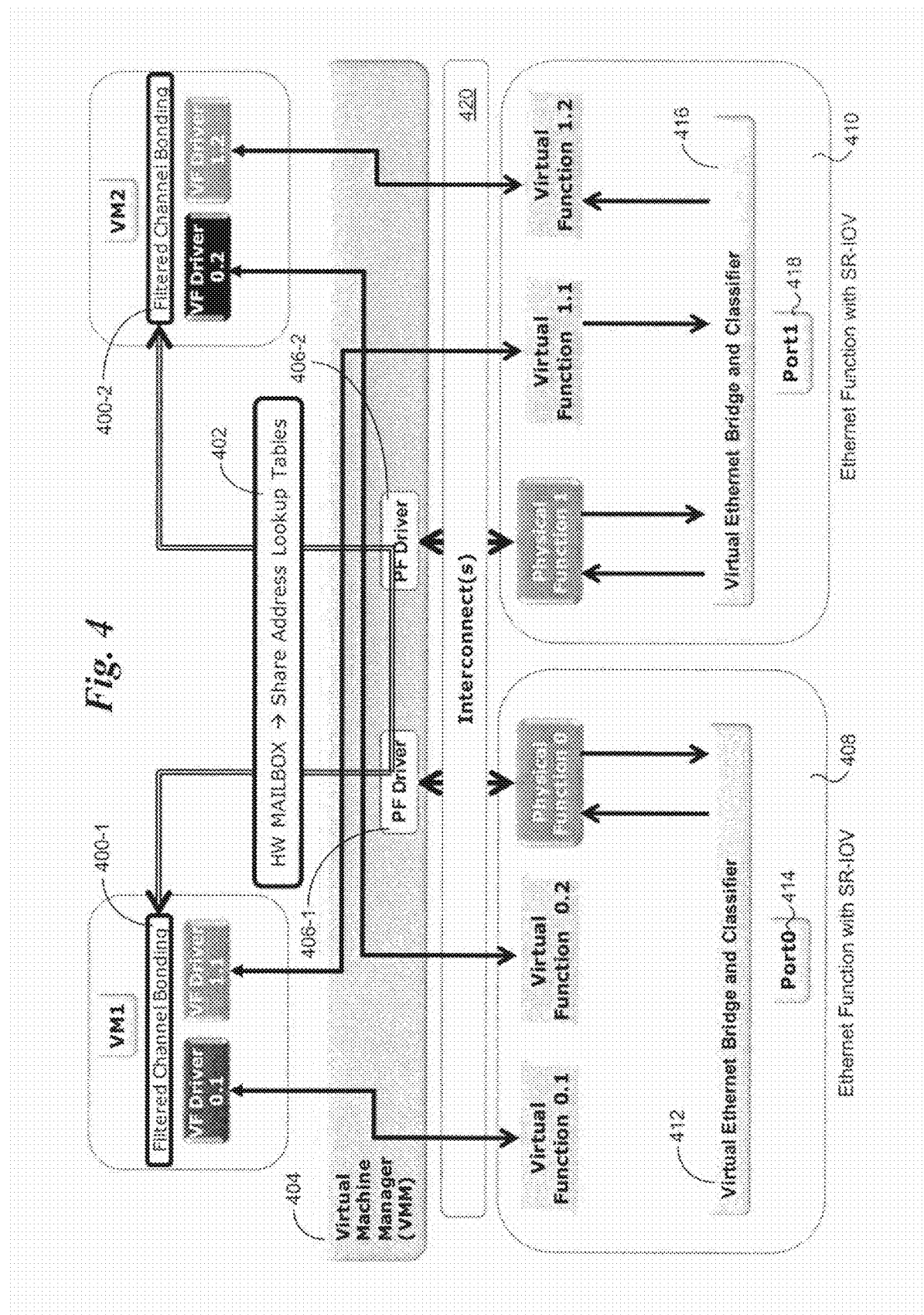

SR-IOV FAILOVER AND AGGREGATION CONTROL SYSTEM TO ENSURE WITHIN-PHYSICAL-PORT VEB LOOPBACK

TECHNICAL FIELD

The field of invention relates generally to computer systems and, more specifically but not exclusively relates to aggregation, routing, and failover of ports in virtualized environments.

BACKGROUND ART

In recent years, virtualization of computer systems has seen rapid growth, particularly in server deployments and data centers. Under a conventional approach, a server runs a single instance of an operating system directly on physical hardware resources, such as the CPU, RAM, storage devices (e.g., hard disk), network controllers, I/O ports, etc. Under a virtualized approach, the physical hardware resources are employed to support corresponding virtual resources, such that multiple Virtual Machines (VMs) may run on the server's physical hardware resources, wherein each virtual machine includes its own CPU allocation, memory allocation, storage devices, network controllers, I/O ports etc. Multiple instances of the same or different operating systems then run on the multiple VMs. Moreover, through use of a virtual machine manager (VMM) or "hypervisor," the virtual resources can be dynamically allocated while the server is running, enabling VM instances to be added, shut down, or repurposed without requiring the server to be shut down. This provides greater flexibility for server utilization, and better use of server processing resources, especially for multi-core processors and/or multi-processor servers.

An important aspect of server architectures is design for enhanced reliability, availability, and serviceability (RAS). RAS servers are targeted to environments such as server farms and data centers requiring RAS features. In order to support these features, both the RAS server hardware and software are designed to support redundancies and automatic failure in response to detection of system faults. This includes support for redundant physical ports.

As discussed above, virtualization increases server flexibility and utilization. In order to maximize both, deployments will often utilize most or all of the available physical ports, whether these ports are architected as primary ports or standby ports (utilized to support failover in the event of a primary port failure). The aggregation and fail-over usage of these physical ports becomes more complicated when virtualization is employed, since the virtualized ports are mapped to physical ports by the virtualization software. In further detail, under a typical virtualization implementation, the virtualization software comprises a thin layer between the platform physical hardware and the operating system(s) running on the virtual machine(s). Thus, if a physical resource becomes unavailable, corresponding virtual services implemented via that physical resource may likewise become unavailable.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 2 is a combined schematic and block diagram illustrating a high-level view of communications between multiple VMs running on server in a rack server;

FIG. 4 is a block diagram illustrating implementation of an Intelligent Channel Bonding Driver that dynamically enforces inter-VM traffic to ensure internal loopback within the same physical port;

DESCRIPTION OF THE EMBODIMENTS

Figure 1:
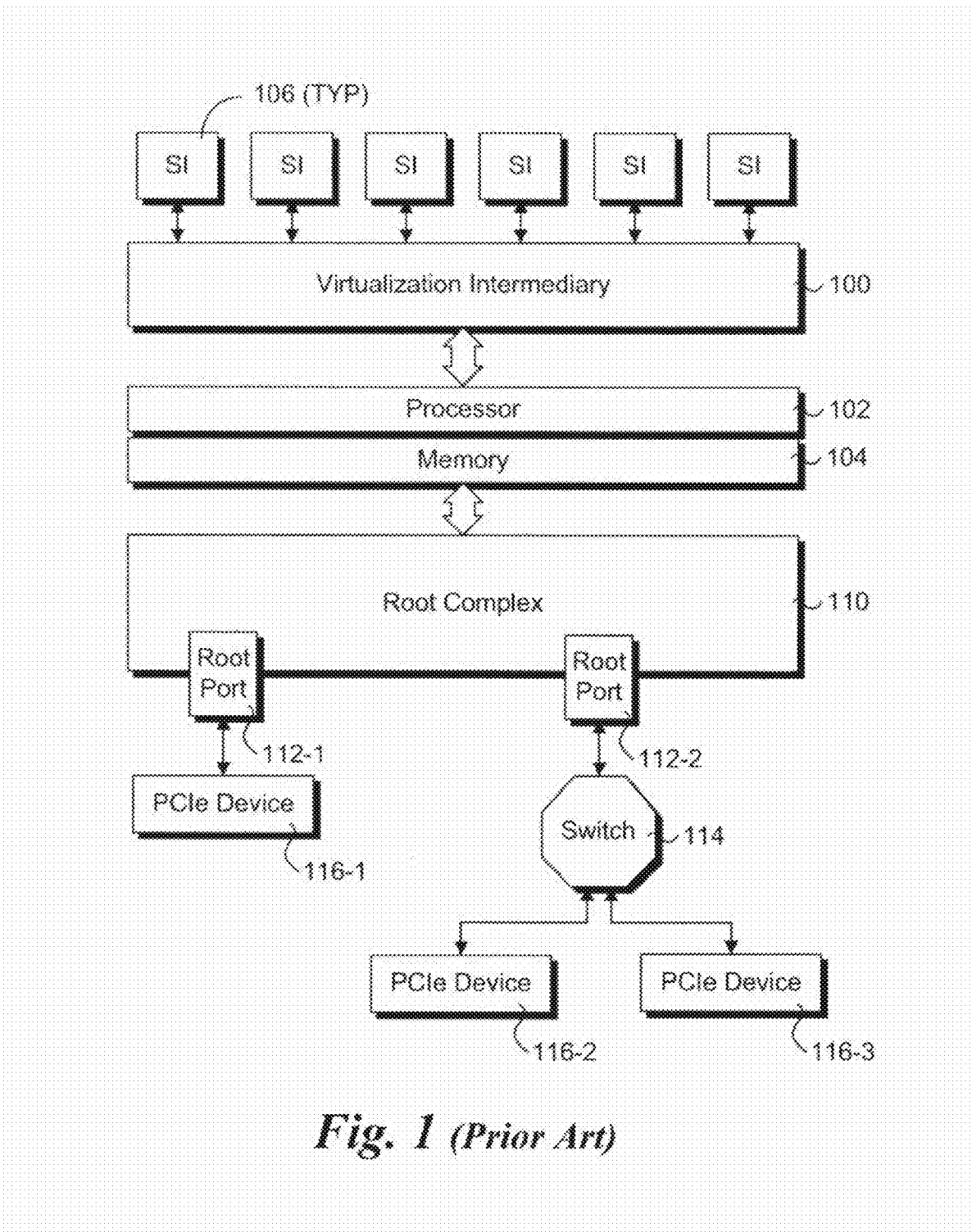
FIG. 1 is a block diagram illustrating a generic virtualized platform configured to support access to multiple PCIe devices.

Embodiments of methods, apparatus and systems for effecting VM platform communication loopback and enabling user initiated network port failover are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(TYP)" meaning "typical." It will be understood that the configuration of these components will be typical of similar components that may exist but are not shown in the drawing Figures for simplicity and clarity.

FIG. 1 illustrates a generic virtualized platform configured to support access to multiple PCIe devices in accordance with the Peripheral Component Interconnect (PCI)

Express Base Specification. At the heart of the virtualized platform is a virtualization intermediary (VI) 100, which is typically implemented as a VMM or hypervisor and multiple VM's. VI 100 abstracts hardware resources, as exemplified by a processor 102 and memory 104, to present each of multiple System Images (SI) 106 with its own set of virtual resources. The actual hardware resources (used on implement corresponding virtual resources) available to a given SI 106 can vary based on workload or other policies implemented by VI 100. The SI's comprise software such as an operating system that is used to execute applications or trusted services, e.g., a shared or non-shared I/O device driver.

In addition to processor and memory resources, other resources are abstracted by VI 100 including resources for supporting PCIe devices. These are depicted in FIG. 1 as a PCIe root complex 110, PCIe root ports 112-1 and 112-2, a switch 114, and PCIe devices 116-1, 116-2, and 116-3. Generally, one or more root complexes can be supported per platform, with one or more root ports per root complex. Each root port represents a separate hierarchy per the PCI Express Base Specification. Each hierarchy is referred to as a single root hierarchy to delineate it from the multiple hierarchy technology defined with the Multi Root I/O Virtualization Specification.

FIG. 2 shows a high-level view of communications between multiple VMs running on servers in a rack server 200-1. Rack server 200-1 is typical of servers implemented in high-density server farms and data centers, and includes a rack in which multiple servers 202-1, 202-2, 202-3 and 202-4 are installed, with each server installed in a corresponding slot in the rack. The servers are coupled in communication with a network switch 203 via Ethernet cables or the like.

FIG. 2 depicts further details of servers 202-1, 202-2, 202-3 and 202-4 below rack server 200-1, wherein each server block diagram corresponds to a respective server in rack server 200-1 sharing the same reference number. Each of servers 202-1, 202-2, 202-3 and 202-4 include various hardware components such as a processor and memory (not shown) for hosting a respective VMM 204 instance and four virtual machines. For example, server 202-1 hosts a VMM 204-1 and virtual machines VM 1-1, VM 1-2, VM 1-3, and VM 1-4. Each server 202 also includes one or more network ports 206 (e.g., network port 206-1 for blade server 202-1). The network ports are representative of applicable PCIe interfaces and Network Interface Controller (NIC) hardware and logic to facilitate communication over a Local Area Network 208 that employs switch 203 for routing and switching functions. For example, the NIC hardware may correspond to a wired Ethernet interface or a wireless interface to support a wireless connection, such as an IEEE 802.11n connection. In turn, switch 208 is depicted as being connected to a router 210 in a network 212. Also shown are two additional rack servers 200-2 and 200-3, each having a similar configuration to rack server 200-1 and including a respective network switch 203-2 and 203-3 shown connected to router 210.

In general, network 212 may be a separate network, such as a LAN, WAN, or intranet, or may be part of LAN 208. In addition, router 210 may be connected to other network equipment to facilitate connections with other networks (not shown), including the Internet.

As discussed above, the virtualization intermediary layer provides an abstraction between the SI's (running on the VMs) and the platform hardware. In the server configurations of FIG. 2, all inbound and outbound I/O operation must be intercepted and processed by virtualization software components (collectively depicted as VMMs for simplicity), adding significant platform resource and latency overhead. Moreover, since the network port(s) is/are shared by the VMs, bottlenecks may result from contention for shared physical resources, causing further increases in packet processing latencies.

Figure 2A:
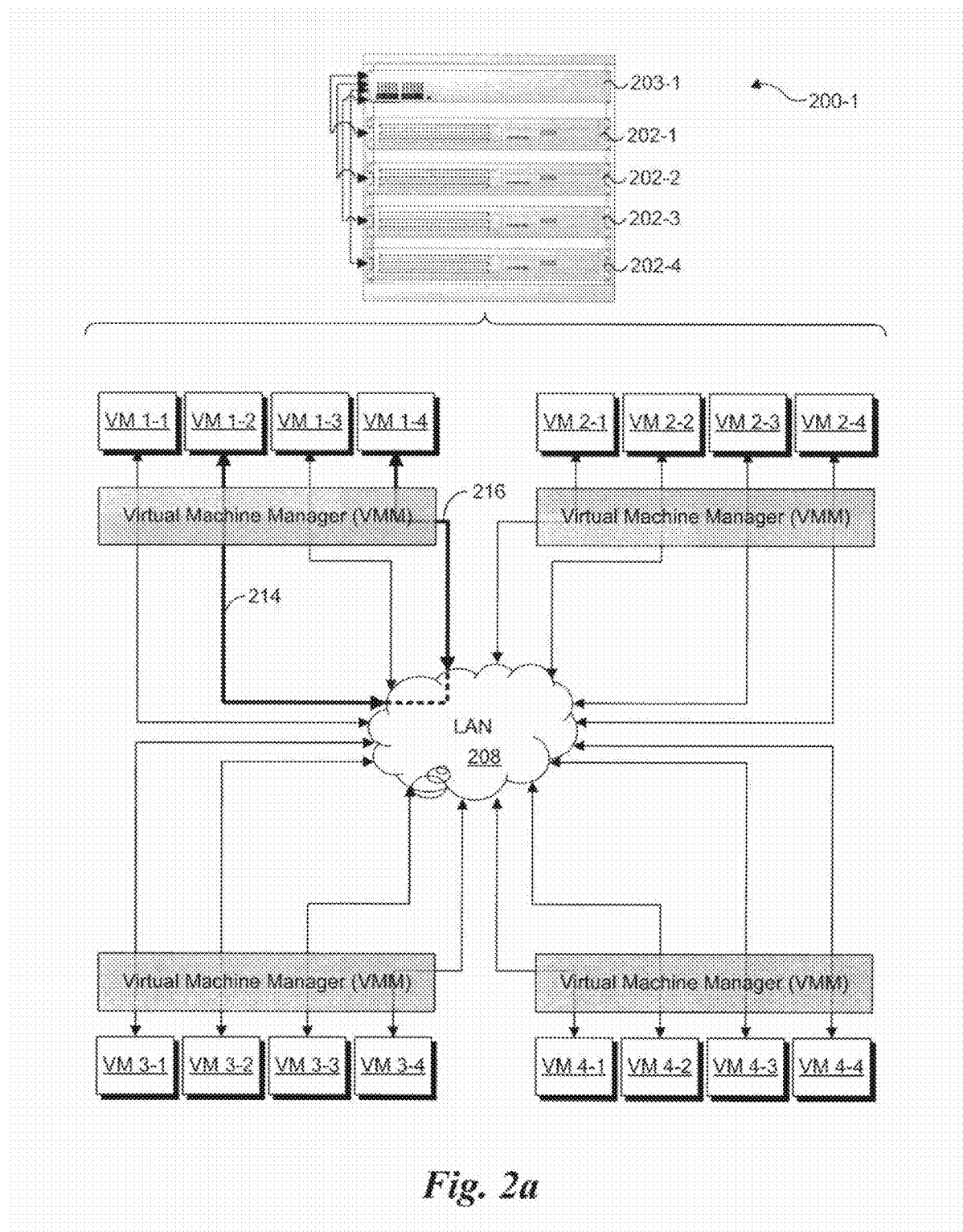
FIG. 2a is an abstracted version of FIG. 2 illustrating communications between VMs in the rack server.

FIG. 2a shows an abstracted version of FIG. 2, wherein just the virtual machines, VMMs and LAN 208 are shown to better illustrate communication paths between VMs that are hosted by servers in the same rack server. Notably, any communication between VMs is routed through network devices that are external to the servers (e.g., switch 203-1 for LAN 208). This applies to network protocol-based communication between and VMMs in the same server (referred to herein as inter-VM traffic), as illustrated by connection paths 214 and 216 between VM 1-2 and VM 1-4 in FIG. 2a. To reduce the resource overhead associate with use of virtualization, PCI-SIG® developed the Single Root Virtual I/O (SR-IOV) specification. The use of SR-IOV provides many benefits over the conventional virtualization intermediary approach, including providing the ability to eliminate VI involvement in main data movement actions, e.g., DMA, Memory space access, interrupt processing, etc.; elimination of VI interception and processing of each I/O operation; providing a standardized method to control SR-IOV resource configuration and management through a Single Root PCI Manager (SR-PCIM); providing the ability to reduce the hardware requirements and associated cost with provisioning potentially a significant number of I/O Functions within a device; and providing the ability to integrate SR-IOV with other I/O virtualization technologies such as Address Translation Services (ATS), Address Translation and Protection Table (ATPT) technologies, and interrupt remapping technologies to create robust, complete I/O virtualization solutions.

Figure 3:
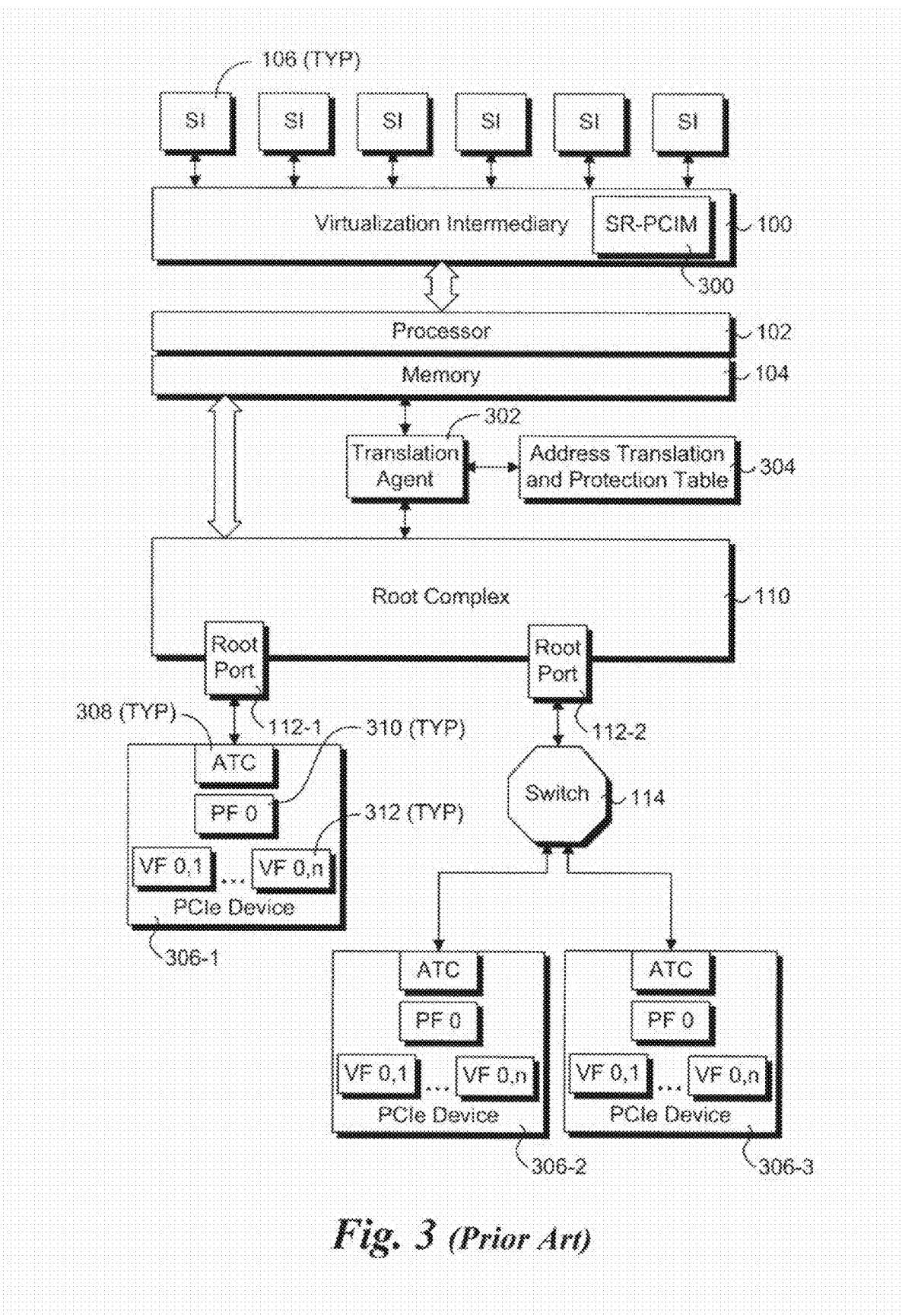
FIG. 3 is a block diagram illustrating an example of a generic SR-IOV configured platform.

FIG. 3 illustrates an example of a generic SR-IOV configured platform. In addition to elements described above with reference to the generic platform configuration of FIG. 1, the SR-IOV generic platform configuration depicted in FIG. 3 further includes a Single Root PCI Manager (SR-PCIM) 300, a Translation Agent (TA) 302, and an Address Translation and Protection Table (ATPT) 304. In addition, the PCIe devices are reconfigured to support SR-IOV operations. As depicted, each of PCIe devices 306-1, 306-2, and 306-3 include an Address Translation Cache (ATC) 308, a Physical Function (PF) 310, and a plurality of Virtual Functions (VFs) 312.

SR-PCIM 300 comprises software responsible for the configuration of the SR-IOV capability, management of Physical Functions and Virtual Functions, and processing of associated error events and overall device controls such as power management and hot-plug services. It is logically located in the VI layer, as shown.

TA 302 comprises hardware or a combination of hardware and software responsible for translating an address within a PCIe transaction into the associated platform physical address. A TA may contain an Address Translation Cache to accelerate translation table access. A TA may also support the PCI-SIG Address Translation Services Specification which enables a PCIe Function to obtain address translations a priori to DMA access to the associated memory. The use of a TA is optional in an SR-IOV implementation.

ATPT 304 contains the set of address translations accessed by a TA to process PCIe requests—DMA Read, DMA Write, or interrupt requests. In PCIe, interrupts are treated as memory write operations. Through the combination of a Requester Identifier and the address contained within a PCIe transaction, an interrupt can be routed to any target (e.g., a processor core) transparent to the associated I/O Function. DMA Read and Write requests are translated through a combination of the Routing ID and the address contained within a PCIe transaction. The use of ATPT is optional in an SR-IOV implementation.

An ATC 308 can exist in two locations within a platform: within the TA which can be integrated within or sit above a root complex; or within a PCIe Device, such as depicted in FIG. 3. Within a root complex, the ATC enables accelerated translation lookups to occur. Within a PCIe Device, the ATC is populated through ATS technology. PCIe transactions that indicate they contain translated addresses may bypass the platform's ATC in order to improve performance without compromising the benefits associated with ATPT technology. The use of ATC is optional in an SR-IOV implementation.

A PF 310 is a PCIe Function (per the PCI Express Base Specification) that supports the SR-IOV capability and is accessible to an SR-PCIM, a VI, or an SI. A VF 312 is a "light-weight" PCIe Function (per the SR-IOV specification) that is directly accessible by an SI. On an abstract level, a VF operates as a virtual instance of a PF, such that from an SI point of view a VF appears as an instance of a PF. Minimally, resources associated with the main data movement of the Function are available to the SI. A VF can be serially shared by different SI, e.g., a VF can be assigned to one SI and then reset and assigned to another SI. A VF can be optionally migrated from one PF to another PF. All VFs associated with a PF must be the same device type as the PF, e.g., the same network device type or the same storage device type. In one embodiment, there may be up to 63 Virtual Functions per Physical Function.

In a virtualized environment using Single Root Virtual I/O, a virtual machine can implement a Software Teaming driver such as the Linux Channel Bonding driver (CBD) to achieve Aggregation of and Failover between multiple physical Ethernet ports. Each VM can run a separate iteration of the CBD to bond two or more virtual functions (VFs) from two different physical ports. To ensure VM-to-VM traffic is routed through the internal Virtual Ethernet Bridge (VEB) Switch of the Ethernet Controller, the traffic may need to be constrained between VFs from the same physical port. However since CBDs in each VM run asynchronously, at any given time Inter-VM traffic may be sent from one physical port to a different physical port. Accordingly, routing Inter-VM traffic through the same physical port cannot be guaranteed using a conventional CBD. For systems requiring loopback (for low latency and to avoid requirement of an external switch) this is not acceptable.

One approach to address the foregoing problem is to provide extensive hardware support in the Ethernet controllers to extend the VEB capability across physical ports. However, this approach is rather restrictive, requiring additional costs and providing limited flexibility.

In accordance with aspects of embodiments of the invention, the foregoing deficiencies are addressed through use of an Intelligent Channel Bonding Driver that dynamically enforces inter-VM traffic to ensure internal loopback within the same physical port (and thus within the platform, without requiring routing via an external switch). A first intelligent CBD at a sending VM detects the target destination address of the destination VM and ensures that the same physical port is chosen by a second intelligent CBD at the destination VM to deliver that packet. To achieve this, in one embodiment all the VM CBD's dynamically exchange information about the MAC Address and VLAN (Virtual Local Area Network) of the virtual function drivers being used by each of the CBD's. A simple filter is implemented to ensure correct direction of packets based on their destination. In one embodiment, the lookup tables are exchanged using an Ethernet controller Hardware Mailbox feature that allows the Physical function Driver to communicate with each of the VF Drivers. The PF driver also is used for allocating the Inter-VM bandwidth. The advantage of using the HW Mailbox is that it allows inter-VF-driver communication without involving any software elements in the iCBD or base Driver, and the mechanism can be controlled at a higher level of privilege than the VM's. One of the key user concerns is that the VM should not be able to control any functionality on the system beyond the privilege level of that VM. Using a HW mechanism for inter-VM data exchange achieves that while still maintain the flexibility of a software-based configuration sharing method.

An exemplary platform configuration implementation of the foregoing approach is shown in FIG. 4. At the top of the diagram is a pair of virtual machines VM1 and VM2. VM1 sits above a Filtered Channel Bonding driver 400-1, which is also disposed between VM1 and a pair of VF Drivers 0.1 and 1.1. In a similar configuration, VM2 sits above a Filtered Channel Bonding driver 400-2, which is disposed between VM2 and a pair of VF Drivers 0.2 and 1.2. A Hardware (HW) Mailbox 402 is shared by the Filtered Channel Bonding drivers 400-1, and 400-2, and is depicted above a Virtual Machine Manager 404, which includes a pair of PF drivers 406-1 and 406-2.

The lower portion of the diagram in FIG. 4 includes a pair of Ethernet Function with SR-IOV blocks 408 and 410. Ethernet Function with SR-IOV block 408 includes a pair of Virtual Functions 0.1 and 0.2, a Physical Function 0, a Virtual Ethernet Bridge and Classifier 412, and an Ethernet port 414 (also referred to as Port0). Ethernet Function with SR-IOV block 410 is similarly configured and includes a pair of Virtual Functions 1.1 and 1.2, a Physical Function 1, a Virtual Ethernet Bridge and Classifier 416, and an Ethernet port 418 (also referred to as Port 1).

Communication between physical components in the platform are facilitated via applicable interconnects, which are collectively depicted as an Interconnect(s) block 420. Connection paths between virtual components are also depicted as double-headed arrows; it will be understood that these connections are actually implemented between physical hardware components hosting the virtual components and over physical interconnect structure using applicable protocols. In one embodiment, the interconnect structure includes multiple PCIe links. In one embodiment, the interconnect structure includes an Intel® Virtual Technology for Directed I/O (VT-d) interconnect and associated functionality, such as enhanced I/O performance through direct assignment. The use of VT-d and SR-IOV supports direct connections between components such that communication between the components may be implemented in a manner that bypasses the VMM.

Aspects of the platform configuration of FIG. 4 are representative of typical platform architectures employed for RAS servers. The reliability and availability aspects are facilitated by the use of redundant physical ports for the Ethernet function—if one fails, the other is still available to support port failover. However, rather than use one of the physical ports as only a failover (i.e., backup) port, both physical ports are used during normal operations. To facilitate use of both ports, there are also redundancies in the Virtual Functions and the VF drivers, as illustrated. Similarly, there are redundancies for the Physical Functions and the PF Drivers. In addition, the use of multiple ports supports scalability and enhances performance.

In further detail, VF Driver 0.1 for VM1 is employed to facilitate operation of Virtual Function 0.1 corresponding to Ethernet Port0, while VF Driver 1.1 for VM1 is employed to facilitate operation of Virtual Function 1.1 corresponding to Ethernet Port1. Similarly, VF Driver 0.2 for VM2 is employed to facilitate operation of Virtual Function 0.2 corresponding to Ethernet Port 0, while VF Driver 1.2 for VM2 is employed to facilitate operation of Virtual Function 1.2 corresponding to Ethernet Port1.

The use of Linux Channel Bonding enables the aggregation of the virtual resources associated with Ethernet Port0 and Port1, such that a given communication operation for a VM may be dynamically allocated to either of Ethernet Port0 or Port1 when both are operational. Although this dynamic allocation is advantageous, it also creates the potential for routing inter-VM communication traffic between VM's on the same platform via different ports, causing the traffic to be further routed through an external switch.

Figure 4A:
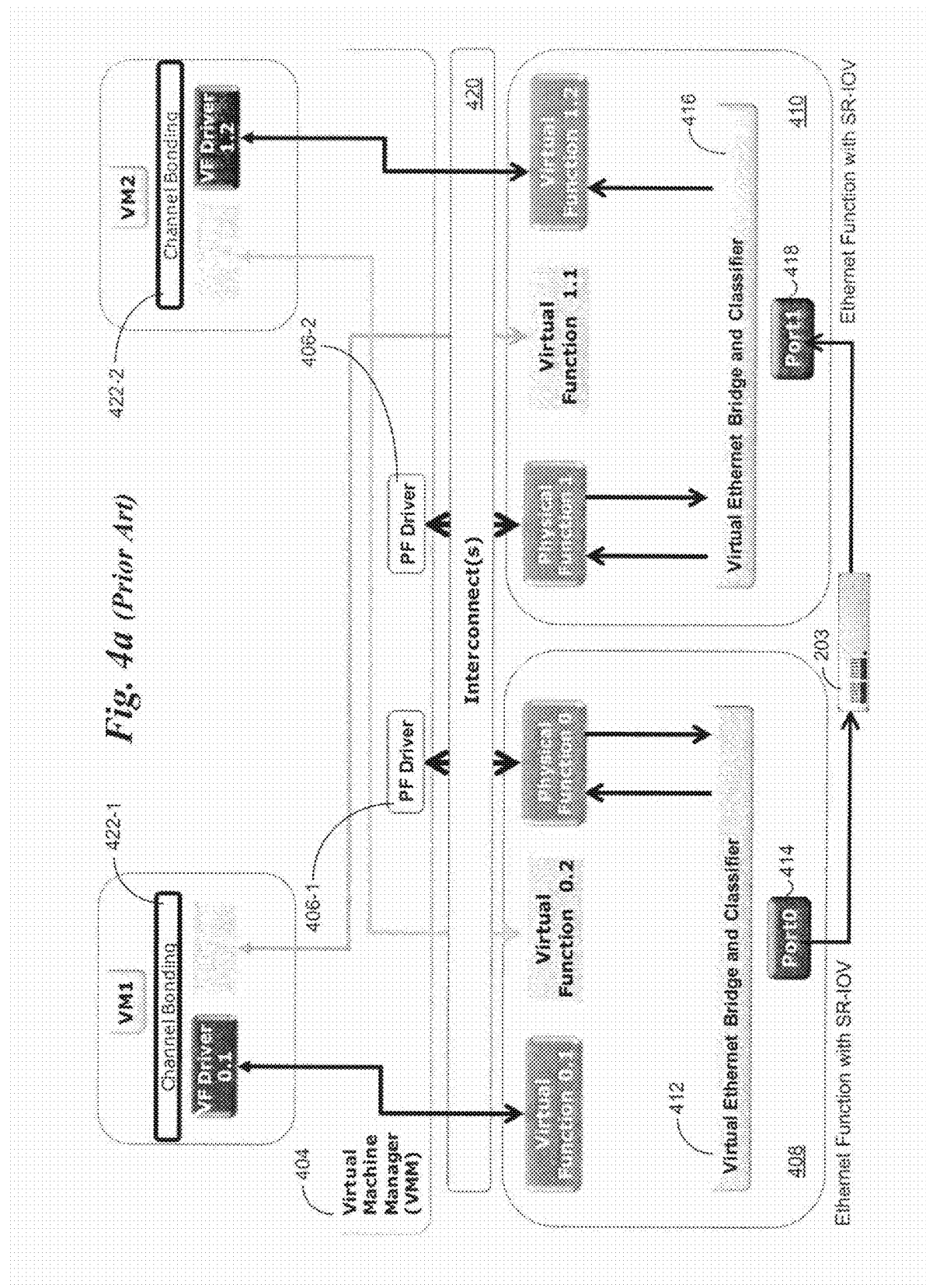
FIG. 4a is a block diagram of a platform configuration employing a conventional Channel Bonding Driver that may route inter-VM traffic via separate ports, requiring use of an external switch.

FIG. 4a illustrates an example of this situation. In this conventional platform configuration, Channel Bonding drivers 422-1 and 422-2 have replaced Filtered Channel Bonding drivers 400-1 and 400-2 of FIG. 4, while HW Mailbox 402 has been removed. Also, the shading of VMM 404 has been lightened to illustrate the VMM is bypassed when direct connections implemented via SR-IOV are employed.

FIG. 4a further illustrates a communication flow path between VM1 and VM2. VM1 initiates the communication, with Channel Bonding driver 422-1 selecting to employ VF Driver 0.1 for outbound communications. Thus, Virtual Function 0.1, which is associated with Physical Function 0, is used. This results in the use of Port0 for the outbound communication. Meanwhile, VM2 is configured to receive a next (i.e., asynchronous) inbound communication using Port1, which is facilitated through the use of VF Driver 1.2, Virtual Function 1.2, and Physical Function 1. As a result, the communication must go outbound from Port0 through a switch 203 to reach Port1, adding latency to the communication flow.

To eliminate the potential for routing communications between VMs on the same platform through external switches, the filtering used by the Filtered Channel Bonding drivers 400-1 and 400-2, in combination with VLAN network port to VF driver address mapping information in HW Mailbox 402 ensures that communication between VMs on the same platform employ the same physical port. In further detail, VLAN network port to VF driver mapping information that identifies the VF drivers used to access each network port information is maintained in HW Mailbox 402. This network port to VF driver mapping information is shared by Filtered Channel Bonding drivers 400-1 and 400-2, enabling intelligent routing of inter-VM traffic in a manner that ensures a single physical port is used for communications between VMs.

Figure 4B:
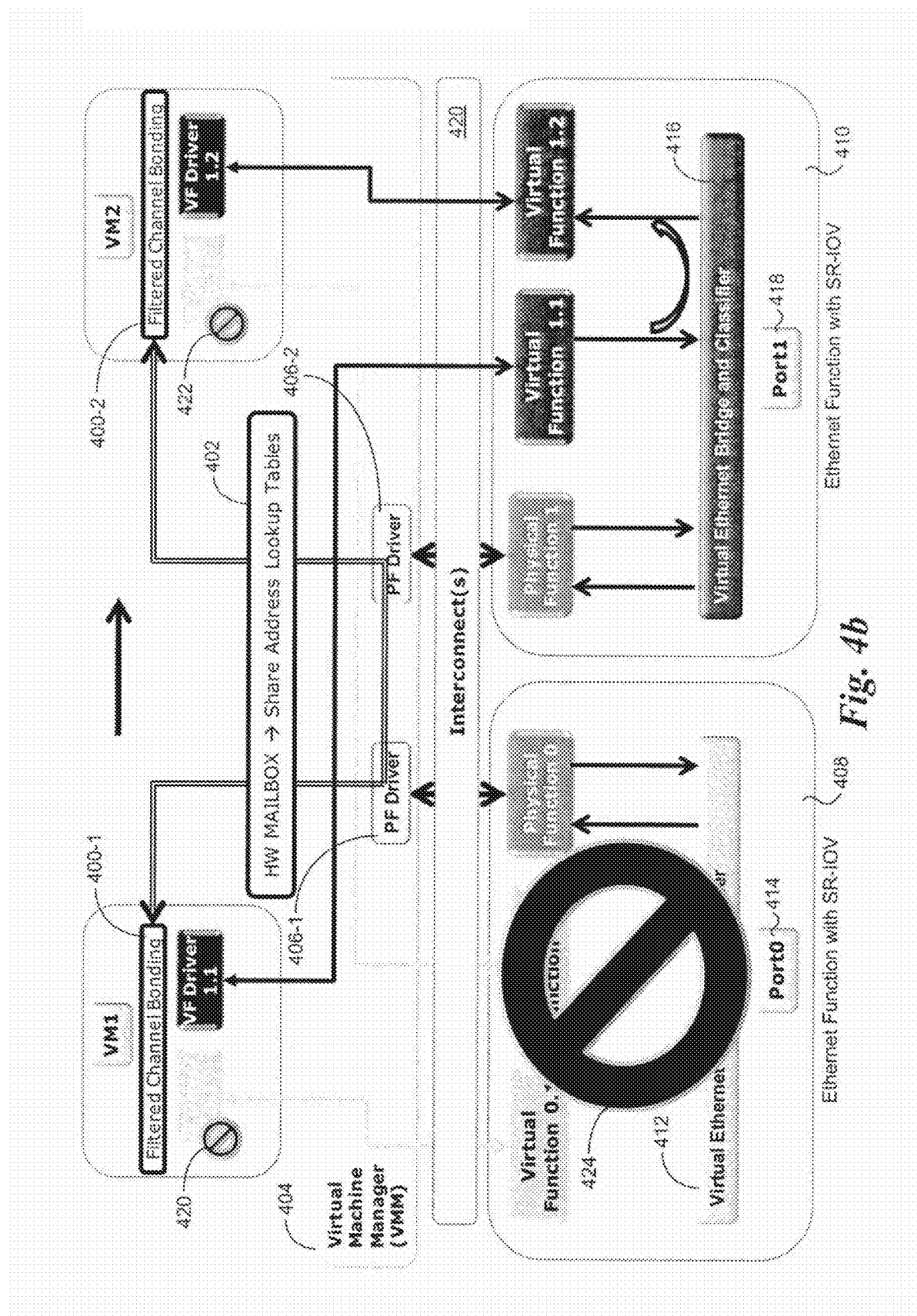
FIG. 4b is a block diagram of the platform configuration of FIG. 4 after traffic routing has been reconfigured to route traffic between first and second VMs using the same port.

For example, in the configuration illustrated in FIG. 4b, it is ensured that any communication from VM1 to VM2 goes through Port1. Effect of the routing configuration is depicted by symbols 420 and 422, indicating that use of VF Driver 0.1 and VF Driver 0.2 is configured to be unavailable, thus disabling Virtual Function 0.1 and Virtual Function 0.2 (as depicted by symbol 424). As a result, Ethernet Port0 is not available for routing, causing all communications between VM1 and VM2 to be routed to Ethernet Port1. In turn, Virtual Ethernet Bridge and Classifier 416 is configured to perform a communication loopback function, such that communications between VMs routed to the same port are looped back internally without being sent outbound from the port. This provides a substantial reduction in latency and enhances communication bandwidth between VMs on the same platform.

In the exemplary platform configuration illustrated in FIGS. 4 and 4b, only two VMs and two network ports are shown. However, this is for simplicity and clarity for better understanding the principles and teachings for implementing platform components and operations and is not to be limiting. In general, these principles and teachings may be applied to a platform employing two or more VMs and two or more physical network ports that are accessible to the VMs via corresponding VF drivers.

Another aspect of some embodiments enables a user-initiated (i.e., manual) failover process to be invoked via a software interface, such as a VMM monitor or other user interface that enables access to a VMM or Hypervisor. Manual failovers of this sort are useful for validating designs and verifying proper operation of components used to facilitate run-time failovers that are initiated in response to detection of a failed component or interface. Another scenario for user-initiated failover is for routine maintenance of a redundant system where the operator needs to take one of the networks offline.

Figure 5:
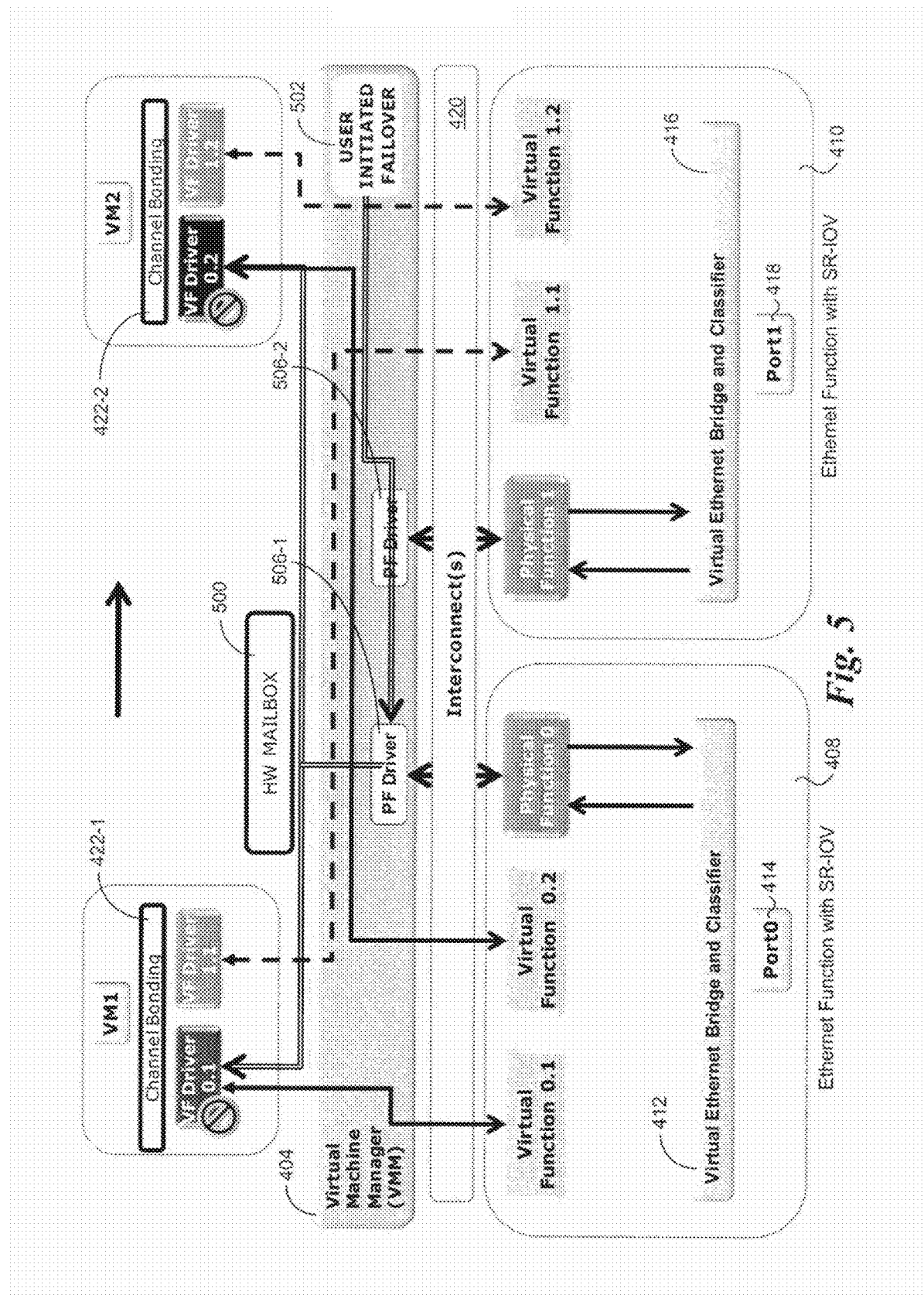
FIG. 5 is a block diagram of a platform configuration including a software interface for supporting user-initiated port failovers.

FIG. 5 shows an exemplary platform configuration for supporting the user-initiated failovers. As depicted, the various software and hardware components in FIG. 5 are similar to those shown in FIGS. 4, 4a, and 4b, wherein components sharing the same reference numbers perform similar functions. In one embodiment platform facilities for implementing manual failovers include a Hardware (HW) Mailbox 500, a user initiated failover interface 502, and PF Drivers 506-1 and 506-2.

Figure 5A:
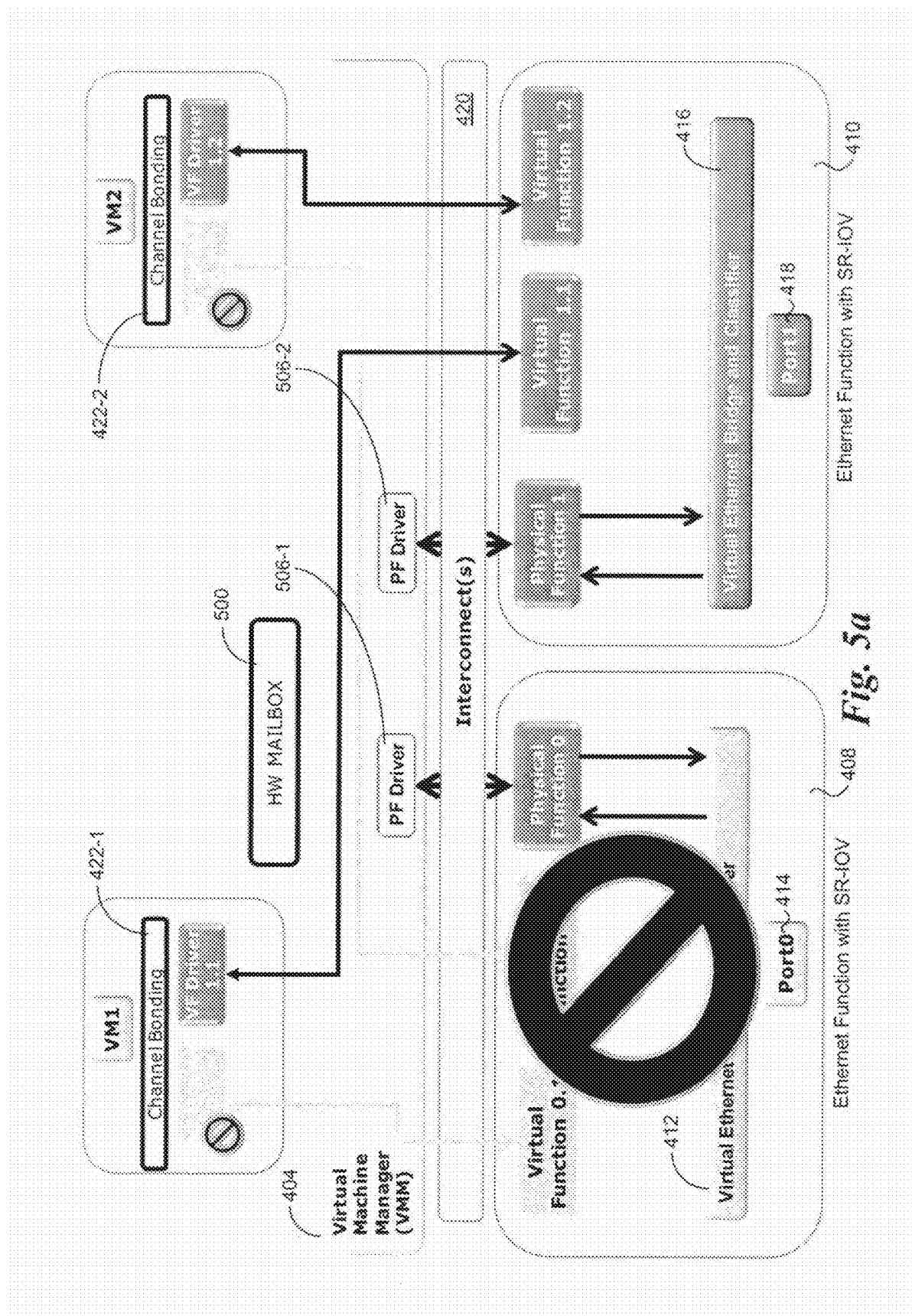
FIG. 5a is a block diagram illustrating a platform configuration after a port failover operation has been completed.

The failover process result shown in FIG. 5 corresponds to a simulated failure of Port0, resulting in a failover to Port1 for all communications involving VM1 and VM2. The process is initiated by a user via user-initiated failover interface 502. In response, PF Driver 506-1 simultaneously signals all the VF drivers from one physical port (e.g., VF Drives 0.1 and 0.2 corresponding to Virtual Functions 0.1 and 0.2 associated with Port0)to advise the CBD's 422-1 and 422-2 of a Port 0 link failure event. Each CBD responds as per normal operation by switching over to an applicable standby port (e.g., the non-failed port in a two-port configuration). The resulting VF Driver, Virtual Function and active Port configuration are shown in FIG. 5a. A simulated failure of Port1 and resulting failover process to Port0 can be initiated in a similar manner through use of PF Driver 506-2. Under each failover, a platform's VM's (e.g., VM1 and VM2 in this example) would be unaware of any operational change since each VM only uses its associated Channel Bonding Driver as its network Port.

In addition to enabling users to initiate failovers, in one embodiment the user interface and associated components may be implemented to enable disabled components to be re-enabled. This enables a failover to be initiated by a user, and after the results of a corresponding failover operation are verified or other testing is performed, allows the user to return the platform to its original operational state from a convenient user interface.

Aspects of the foregoing embodiments may be implemented via software and/or firmware components or programs comprising instructions that are executed on a physical or virtual machine. Thus, embodiments of this invention may be used as or to support instructions executed upon some form of real or virtual machine or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
    configuring routing of network communications in a platform employing a plurality of virtual machines (VM) and a plurality of network ports, wherein each of a first VM and second VM are configured to at least one of send or receive communications via at least two network ports and
    employing a filtered channel bonding driver to filter network communications originating at the first VM and destined for the second VM to loop back the network communications within the platform by routing the network communications from the first VM via one of the at least two network ports to the second VM.

2. The method of claim 1, wherein the at least two network ports comprise Ethernet ports.

3. The method of claim 1, wherein the filtered channel bonding driver comprises a Linux channel bonding driver.

4. The method of claim 1, further comprising employing a shared address lookup table in which virtual network addresses of the first VM and the second VM are stored.

5. The method of claim 4, further comprising employing a hardware-based facility for storing and accessing the shared address lookup table.

6. The method of claim 1, further comprising employing a Virtual Ethernet Bridge to facilitate loop back of communications.

7. The method of claim 1, wherein the platform employs a Virtual Machine Manager (VMM), and wherein communications are routed between Virtual Function drivers associated with VMs and the at least two network ports in a manner that bypasses the VMM through use of Single Root Virtual I/O (SR-IOV).

8. The method of claim 1, wherein the at least two network ports are hosted by at least one PCIe network device implementing Single Root Virtual I/O (SR-IOV).

9. The method of claim 1, further comprising configuring routing of communications between VMs such that all communications between VMs employing a network protocol corresponding to the plurality of network ports are looped back within the platform.

10. A computing platform, comprising:
    a processor,
    at least one interconnect, operatively coupled to the processor;
    a plurality of network ports, each included in a network device operatively coupled to an interconnect from among that at least one interconnect;
    memory, operatively coupled to the processor, having instructions stored therein comprising a virtual machine manager (VMM) and configured to be executed by the processor when the platform is operating to,
    configure routing of network communications between a plurality of virtual machines (VM) hosted by the VMM and the plurality of network ports, wherein each of a first VM and second VM are configured to at least one of send or receive communications via at least two network ports; and
    implement a filtered channel bonding driver to filter network communications originating at the first VM and destined for the second VM to loop back the network communications within the platform by routing the network communications from the first VM via one of the at least two network ports to the second VM.

11. The computing platform of claim 10, wherein the at least two network ports comprise Ethernet ports.

12. The computing platform of claim 10, wherein the filtered channel bonding driver comprises a Linux channel bonding driver.

13. The computing platform of claim 10, wherein execution of the instructions facilitates implementation of a shared address lookup table in which virtual network addresses of the first VM and the second VM are stored.

14. The computing platform of claim 13, further comprising a hardware-based facility for storing and accessing the shared address lookup table.

15. The computing platform of claim 10, wherein execution of the instructions implements a Virtual Ethernet Bridge to configured facilitate loop back of communications.

16. The computing platform of claim 10, wherein execution of the instructions facilitates routing of communications between Virtual Function drivers associated with VMs and the at least two network ports in a manner that bypasses the VMM through use of Single Root Virtual I/O (SR-IOV).

17. The computing platform of claim 10, wherein the at least two network ports are hosted by at least one PCIe network device implementing Single Root Virtual I/O (SR-IOV).

* * * * *